Aug. 21, 1951     H. SMITH     2,565,401
LIFTING JACK
Filed Aug. 16, 1946
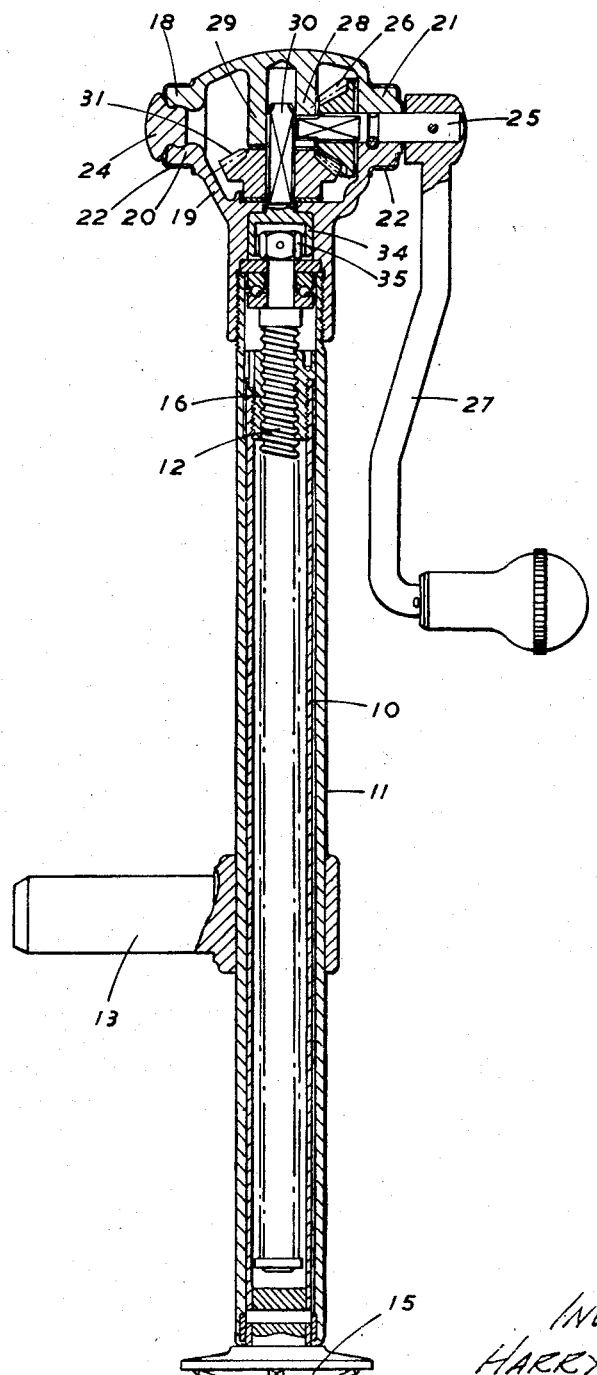
INVENTOR
HARRY SMITH
By Young, Emery & Thompson
ATTYS—

Patented Aug. 21, 1951

2,565,401

UNITED STATES PATENT OFFICE 2,565,401

LIFTING JACK

Harry Smith, London, England, assignor to Smith's Jacking Systems Limited, London, England, a British company Application August 16, 1946, Serial No. 690,968
In Great Britain September 25, 1945

2 Claims. (Cl. 254—103)

This invention relates to lifting jacks and its main object is to provide a hand-operated lifting jack suitable for motor vehicles in which the handle load is lightened and at the same time its disposition improved by the use of a geared drive and in which operative parts of cheap construction can be used whilst retaining durability and easy action.

According to the invention telescopic tubes are extensible by means of nut and screw members one of which is operatively connected by a universal joint to a gearwheel having an operative connection with an operating handle or wheelbrace. This gearwheel and its operative connection are preferably meshed rotary elements such as bevel wheels or spirals or worm and wheel, and they may be accurately located on both sides of the teeth. This arrangement ensures that any movement of the nut or screw out of alignment due to machining inaccuracies, tube tolerances, or other causes, is not transmitted to the gearwheels. Consequently perfect meshing of the gears is ensured which enables a small size of tooth to be used and also permits their production in die-cast zinc base alloy without fear of rapid wear. The bevels may be of different sizes to provide torque reduction on the handle.

A constructional form of the invention will now be described by way of example with reference to the accompanying diagrammatic drawing which shows a vertical sectional view of a lifting jack made in accordance with the invention.

The jack comprises inner and outer tubes 10, 11, respectively, containing a long screw 12. The outer tube carries a spigot 13 for permanent or detachable attachment to a suitable part of a motor vehicle such as the running board or chassis. The inner tube carries a foot 15 at its lower end, and at its upper end a nut 16 that engages the screw. The outer tube is attached at its upper end to a two-piece housing made of zinc base die-cast alloy and divided on a horizontal plane and forming the parts 18, 19. The two pieces of the housing are each formed with half bosses 20, 21 over which, during assembly, sleeves 22 are pressed to hold the two parts of the housing together. The bosses are hollow and one provides an oiling hole which is closed by a synthetic rubber plug 24 which also guards the finish of the motor vehicle against damage. The other hollow boss forms a journal for a horizontal spindle 25 which is in the same plane as that on which the housing is divided. The spindle 25 carries a driving bevel wheel 26 on its inner end and a crank handle 27 or suitable hexagon nut for wheelbrace operation on its outer end. The inner end of this spindle is carried in a journal 28 formed integrally with the upper part of the housing which also has a vertical journal 29 carrying the upper end of a vertical spindle 30 on which a driven bevel wheel 31 is mounted. The bevel wheel 26 thus comprises a rotary meshed driving connection between the bevel wheel 31 and the handle 27. The lower end of this spindle bears in the bottom part of the housing and is formed with a cup 34 of hexagonal shape internally but slightly larger than a driven hexagonal nut 35 which is attached to the top end of the screw, and is engaged by the cup 34. Rotation of the crank handle turns the screw at a reduced speed depending on the numbers of teeth in the gears, thereby extending the jack. It will be seen that the spindles 25, 30, are at right angles to each other and are supported in bearings, and thus accurately located, on both sides of the bevel wheels.

When the sleeves 22 are removed the top part of the housing can be lifted off together with the spindle 25 and bevel wheel 26.

I claim:

1. A lifting jack comprising telescopic inner and outer tubes, an elongated screw disposed within the inner tube, a nut threadedly mounted on the screw and connected to the inner tube, a housing on the upper end of the outer tube, said housing being formed of upper and lower parts, means for securing said parts together, a spindle in said housing substantially co-axial with the screw, a second spindle in the housing at a right angle to the first-mentioned spindle, bearings in the upper portion of said housing for the inner ends of said spindles, cooperating meshing bevel gears on said spindles, bearings in said housing for supporting the other ends of the spindles, a universal joint connecting the screw and the spindle in substantial alignment therewith, and an operating handle on the outer end of the other spindle for imparting rotation through said spindles to said screw.

2. A lifting jack comprising telescopic inner and outer tubes, an elongated screw disposed within the inner tube, a nut threadedly mounted on the screw and connected to the inner tube, a housing on the upper end of the outer tube, said housing being formed of upper and lower parts, means for securing said parts together, a spindle in said housing substantially co-axial with the screw, a second spindle in the housing at a right angle to the first-mentioned spindle, bearings in the upper portion of said housing for the inner ends of said spindles, a bearing in the lower part of the housing for supporting the lower end of the spindle in substantial alignment with the screw, cooperating bearing halves in the upper and lower parts of the housing for supporting the outer portion of the second spindle, a universal joint connecting the screw and the spindle in substantial alignment therewith, and an operating handle on the outer end of the other spindle for imparting rotation through said spindles to said screw.

HARRY SMITH.

REFERENCES CITED

The following references are of record in the file of this patent:

UNITED STATES PATENTS

| Number | Name | Date |
|---|---|---|
| 267,339 | Gilbert | Nov. 14, 1882 |
| 1,281,275 | Berry | Oct. 15, 1918 |
| 1,361,593 | Lang | Dec. 7, 1920 |
| 1,465,057 | Riker | Aug. 14, 1923 |
| 1,741,144 | Donnelly | Dec. 31, 1929 |
| 2,107,715 | Runyan et al. | Feb. 8, 1938 |
| 2,398,152 | Nash | Apr. 9, 1946 |